United States Patent [19]

Herren, Jr.

[11] Patent Number: 4,515,374

[45] Date of Patent: May 7, 1985

[54] MOVEABLE TARGET ASSEMBLY

[76] Inventor: Thomas W. Herren, Jr., 6611 Dearborn Dr., Falls Church, Va. 22044

[21] Appl. No.: 553,975

[22] Filed: Nov. 21, 1983

[51] Int. Cl.³ .......................... F41J 9/02; B61B 13/04
[52] U.S. Cl. .................................. 273/359; 104/118; 104/247; 105/30; 238/10 E
[58] Field of Search ...................... 403/157, 158, 159; 104/245, 247, 118, 119; 238/10 R, 10 E; 105/29 R, 30; 239/178, 183, 184; 273/359, 369, 386

[56] References Cited

U.S. PATENT DOCUMENTS

| | | | |
|---|---|---|---|
| 547,141 | 10/1895 | Crutchfield | 273/366 |
| 2,591,624 | 4/1952 | Siebels | 403/79 X |
| 2,836,129 | 5/1958 | Jaeger | 104/245 X |
| 3,586,331 | 6/1971 | Tickell, Jr. | 273/359 |
| 3,848,625 | 11/1974 | Courtright | 239/184 X |
| 3,861,535 | 1/1975 | Huxley et al. | 214/6 B |
| 3,917,270 | 11/1975 | Gothard, Jr. et al. | 273/105.2 |
| 4,126,312 | 11/1978 | Kreuzer et al. | 273/105.2 |
| 4,155,554 | 5/1979 | Adamski et al. | 273/105.2 |
| 4,219,094 | 8/1980 | Sturgill | 180/236 |
| 4,306,630 | 12/1981 | Monte et al. | 180/167 |

Primary Examiner—Randolph Reese
Assistant Examiner—Glenn B. Foster
Attorney, Agent, or Firm—Cushman, Darby & Cushman

[57] ABSTRACT

A moveable target assembly includes a self-propelled carriage upon which a target is mounted for rolling movement across terrain. Axially flexible track sections are coupled together in an end to end fashion so as to define a prescribed course or path which the target will follow. The track defines a substantially planar surface and is relatively thin so that it lies flat on the surface of the terrain and thus does not present an impediment to other vehicles, infantry troops or the like that desire to traverse it. However, as the carriage is propelled along the course defined by the track, a track guide will cause successive portions of the flexible track to be initially upwardly displaced so as to perform its guiding functions yet such portions will be returned to their terrain-engaging relationship once the carriage has advanced.

11 Claims, 4 Drawing Figures

U.S. Patent   May 7, 1985   4,515,374
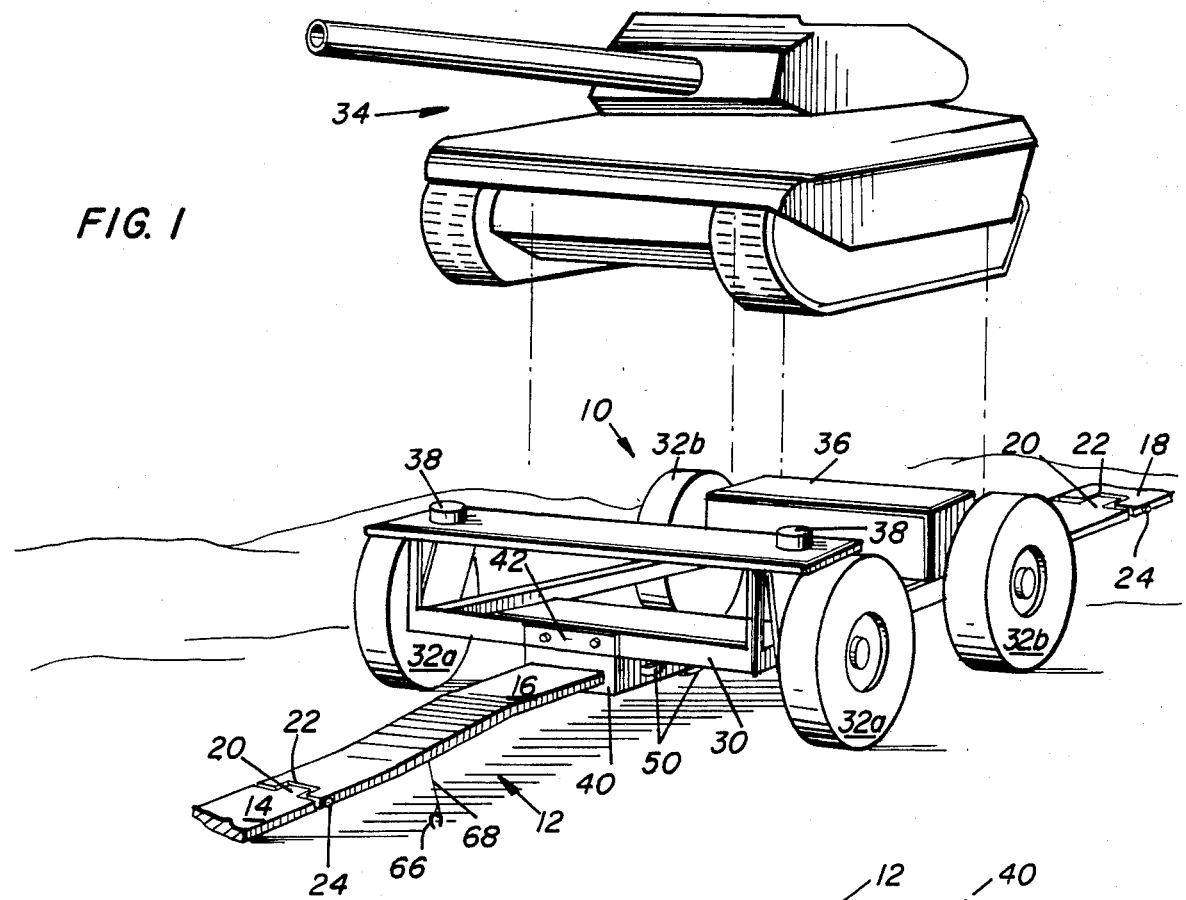
FIG. 1
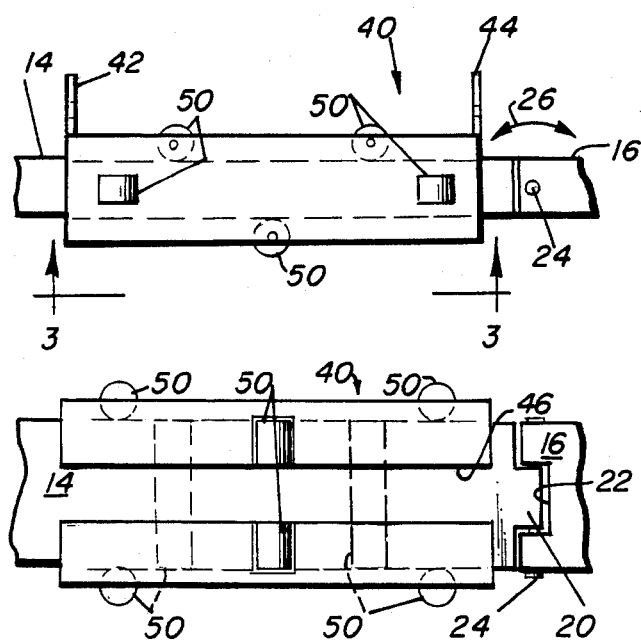
FIG. 2
FIG. 3
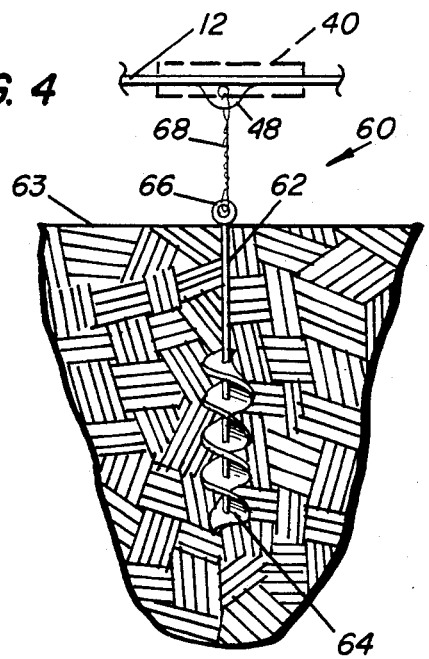
FIG. 4

MOVEABLE TARGET ASSEMBLY

BACKGROUND AND SUMMARY OF THE PRESENT INVENTION

The present invention generally relates to a system for simulating combat situations for the purposes of target practice to aid in marksmanship training. More particularly, the present invention relates to a novel track and track carriage assembly wherein full scale three-dimensional targets can be conveyed along a prescribed course established by the track.

The track in accordance with the present invention is axially flexible and is substantially planar in nature so that when contiguously disposed on the surface of terrain, it is completely unobtrusive. Thus, other vehicles, foot soldiers or the like can easily traverse the track since it does not present any impediment or obstacle to such movement. However, when the self-propelled carriage of the present invention is conveyed by self-contained motor means along the course defined by the track, successive portions of the track will be axially upwardly yieldable by virtue of a guide member fixed to and carried with the carriage. After the upwardly flexed portion is conveyed through the track guide, it will once again be flexibly returned to a contiguous, substantially flat relationship with the terrain thereby once again being unobtrusive to other vehicles, infantry or the like.

Conventional target devices which permit a target to be moved along a prescribed course generally require that the track be rigid in nature and thus, little flexibility is provided for changing the nature of the course. That is, once the fixed track of conventional target systems is in place, it cannot readily be moved. Furthermore, typical rigid tracks of conventional system require entrenchment and thus installation can be rather complicated. Conventional systems tend to be disposed along unrealistic terrain from a combat viewpoint and as a consequence they typically fail to present the combat realism which is essential to proper marksmanship training.

In accordance with the present invention, however, a track system is provided which can be readily assembled and disassembled so as to change the prescribed course. Moreover, since the track of this invention is unobtrusive in nature in that it is normally contiguously disposed on the surface of the terrain, any type of terrain can be provided with a system in accordance with the present invention. Therefore, realistic terrain which includes trees, bushes, buildings or other like firing obstacles can be provided with a target system in accordance with the present invention. No special need exists for providing trenches or the like to house a rigid, fixed track system which is typically the case with conventional systems. Moreover, since the carriage of the present invention is adapted to carry full size three-dimensional facsimiles of military vehicles, the marksman is provided with various vehicle profiles from which his marksmanship can be honed. This combined effect of realistic terrain and target will provide the marksman with virtually and unlimited variety of target profiles which ill continually move into and out of defilade positions due to the realistic firing obstacles and natural fortifications provided by the terrain.

The art, of course, is replete with various proposals for providing moveable targets as exemplified by the following U.S. Patents, the disclosures of each of which are expressly incorporated hereinto by reference:

U.S.Pat. No. 4,306,630 to Monte et al;
U.S. Pat. No. 4,126,312 to Kreuzer et al;
U.S. Pat. No. 3,917,270 to Gothard, Jr. et al;
U.S. Pat. No. 4,155,554 to Adamski et al;
U.S. Pat. No. 3,586,331 to Tickell, Jr. et al; and
U.S. Pat. No. 547,141 to Crutchfield.

Of the above patents, Monte et al, Kreuzer et al, Gothard, Jr. et al and Adamski et al each relate to remotely controlled self-propelled target vehicles utilizing radio-controlled techniques whereby the target vehicles can be freely manipulated over the surface of terrain. Tickell, Jr. et al discloses a target assembly whereby an electrically powered vehicle moves along a fixed rigid track and carries therewith a three-dimensional target so as to aid marksmen in practice. Crutchfield relates to a target attached to a continuous belt so that upon movement of the belt, the target will responsively move.

As the reader will appreciate from even a cursory examination of the above-noted U.S. Patents, the present invention presents distinct advantages over the conventional target devices proposed therein. Thus, in accordance with the present invention, a moveable target assembly for use in live-fire or simulated-fire target practice is provided wherein three-dimensional full scale targets can be moved along a prescribed course defined by a flexible track assembly. The flexible track is preferably manufactured in 15–20 foot sections and connected to one another by appropriate pivot pins so as not to defeat the axially flexible nature thereof when the carraige moves along the prescribed course defined by the track.

The target of the present invention is mounted on a carriage having wheels journalled thereto for movement over the terrain. On the lower portion of the frame, there is provided a fixed track guide which accepts the flexible track therein so as to guide the frame and thus the target along the prescribed course. Preferably, the front wheels are freely journalled to the frame so as to be freely pivotal about a vertical axis so that as a curve in the track is encountered, a lateral shifting or "side load" will be established to responsively cause the wheels to pivot and thus follow the track course. Locomotion for the frame and target assembly can be provided by any suitable known means, such as battery powered motor systems or, more preferably, a hydraulic power pack (see e.g. U.S. Pat. No. 3,861,535 to Hucksley, III et al and U.S. Pat. No. 4,219,094 to Sturgill, the entire disclosures of each of which are expressly incorporated herein by reference). Suitable known radio controllers can also be operatively connected to the hydraulic pack, for example, so as to control the speed of the target therealong.

As the carriage moves along the track by virtue of the cooperation thereof between the track and the track guide, successive portions of the track will be flexibly upwardly displaced from the surface of the terrain as it enters the track guide and, thereafter, will return to its terrain-contiguous position after the target device has moved further down the track. In such a manner, the flexible track according to the present invention is completely unobtrusive and will permit target practice over a wide variety of terrain. Accordingly, much more realistic target practice can be established utilizing the system in accordance with the present invention.

These and other objects and advantages of the present invention will become more clear to the reader after careful consideration is given to the detailed description of the preferred exemplary embodiment thereof which follows.

BRIEF DESCRIPTION OF THE ACCOMPANYING DRAWINGS

Reference will be hereinafter made to the accompanying drawings wherein like reference numerals throughout the various figures denote like structural elements, and wherein:

FIG. 1 is a perspective view of the moveable target assembly in accordance with the present invention;

FIG. 2 is a right side elevational view of the track guide for use in the carriage of the present invention;

FIG. 3 is a bottom plan view of the track guide taken along line 3—3 in FIG. 2; and FIG. 4 is a partial cross-sectional elevational view showing the anchoring system of the present invention for anchoring the track thereof to the terrain.

DETAILED DESCRIPTION OF THE PREFERRED EXEMPLARY EMBODIMENT

Referring particularly to FIG. 1, it can be seen that the target assembly in accordance with the present invention generally includes a carriage 10 operatively associated with track 12. Track 12 is preferably substantially rectangular in cross-section to define substantially planar upper and lower surfaces thereof. Additionally, track 12 is constructed of a flexible material (e.g. rubber, flexible synthetic plastics or the like) so as to be flexible in the axial direction (e.g. in the direction of elongation of track 12). Track 12 is composed of discrete individual sections coupled together so as to form a continuous path along which carriage 10 is conveyed. Three representative sections 14, 16 and 18 are shown in FIG. 1 for clarity of presentation although the reader should realize that any desired number of sections can be coupled one to another so as to form any desired prescribed path of conveyance for carriage 10. Additionally, while only straight track sections are shown in the accompanying drawings, the reader should also appreciate that right and left bends can be provided so as to present a meandering course for target practice purposes. One end of each track section defines a tongue portion 20 which cooperates which a yoke 22 defined in the other end of an adjacent track section. Tongue 20 and yoke 22 are coupled together by means of pivot pin 24 so as to permit relative pivotal movement between adjacent track sections (for example, pivotal movement of track sections 14 and 16 as shown by arrow 26 in FIG. 2).

Carriage 10 generally includes a frame 30 having front and rear pairs of wheels 32a, 32b, journalled thereto so as to support frame 30 a predetermined dimension above the terrain surface to permit rolling movement thereacross. Target 34 which is preferably a full scale, three-dimensional facsimile of a military vehicle or the like is fixed to frame 30 by any conventional means. Target 34 can be constructed of any lightweight, preferably rigid, material such as aluminum, plastic or the like. The rear pair of wheels 32b are operatively connected to a power source 36 so as to provide driven power thereto. Power source 36 preferably includes an internal combustion engine having a hydraulic pump which is operatively connected to individual hydraulic motors for the rear pair of wheels 32b (see, for example, U.S. Pat. Nos. 3,861,535 and 4,219,094). Alternately, power source 36 can be in the form of batteries if this is deemed desirable or necessary. Speed control for power source 36 can be by any conventional means and preferably by means of a radio receiver (not shown) which will receive radio-controlled signals from a remotely positioned operator in a manner believed well known to those in this art. Front wheels 32a are connected to frame 30 by means of journals 38 so as to be pivotal generally about a vertical axis.

Coupling between frame 30 and track 12 is accomplished by means of track guide 40 having front and rear mounting flanges 42, 44 (see FIG. 2) which are utilized to fix guide 40 substantially centrally between the front pair of wheels 32a. Track guide 40 in cross-section generally defines a rectangular C-shaped cavity in which track 12 is slidably received. An open channel 46 is established on the bottom portion of track guide 40 so as to permit anchoring eyelets 48 (see FIG. 4) to pass therethrough as carriage 10 is conveyed along track 12. Rollers 50 journalled to track guide 40 are provided so as to permit rolling interaction between track guide 40 and the upper, lower and lateral surfaces of track 12.

Since front pair of wheels 32a are journalled to frame 30 independently of one another so that each is independently pivotal about a substantially vertical steering axis and since track guide 40 is fixed to frame 30, when track guide 40 encounters a curved section of track 12, a force in the centrifugal direction will occur and this force will responsively cause front pair of wheels 32a to pivot in the direction of the curve. Such a "side loading" steering system in accordance with the present invention greatly simplifies the mechanical operations of carriage 10. Accordingly, no special steering system is necessary for the carriage 10 in accordance with the present invention. Of course, guide 40 could be pivotally mounted to carriage 10 with suitable linkage structure between guide 40 and first pair of wheels 32a if this is deemed desirable or necessary.

As previously stated, the track 12 of the present invention is substantially planar so as to provide an unobtrusive guiding system. The track 12 is assembled by coupling discrete track sections 14, 16 and 18, for example, so as to define a prescribed path which carriage 10 will follow. Thus, in a normal position, track 12 will be in a terrain-engaging or terrain-contiguous relationship so that vehicles, infantry, etcetera can cross track 12 without it presenting an impediment to their movement. However, as the carriage 10 is propelled along the course defined by track 12 by virtue of power source 36, successive portions of track 12 will be continuously flexibly urged into sliding engagement with the cavity defined by track guide 40 since track guide 40 is disposed a predetermined dimension above the surface of the terrain. Once the upwardly displaced portions of track 12 successively exit the cavity defined by track guide 40, they will once again flexibly return to its ground-engaging position. This continuous successive flexing of the track in response to the carriage being conveyed therealong will permit the carriage to follow the course prescribed by track 12 yet will also permit the track to remain on the surface of the terrain (except, of course, in the vicinity of guide 40) without presenting an obstacle to any other vehicles, infantry or the like.

Since the track of the present invention is intended to withstand abuses such as vehicles driving over it, infantry or the like, it is desirable to have some means which will maintain the position of the track relative to the terrain and, in this regard, an anchoring system 60 is provided (see FIG. 4). Anchoring system 60 generally includes anchor member 62 having auger bit 64 at one end thereof so as to provide a means by which anchor member 62 can be secured below the surface 63 of the terrain and an eyelet 66 at the other end thereof. Track 12 includes anchoring eyelets 48 axially spaced at predetermined locations on the underside thereof and thus, anchoring member 62 should be placed in the ground in a position corresponding to eyelet 48 so that coupling therebetween can be effected by means of rope, chain or other like flexible cable means generally indicated by numeral 68 in FIG. 4. Sufficient slack should be provided in cable 68 so as to permit track 12 to be flexibly upwardly displaced above surface 63 by at least the dimension which track guide 40 is disposed above surface 63 so as to permit track 12 to be upwardly flexed in the manner described previously.

Thus, while the present invention has been herein described in what is presently conceived to be the most preferred embodiment thereof, those in this art may appreciate that many modifications may be made hereof, which modifications shall be accorded the broadest interpretation of the appended claims so as to encompass all equivalent structures, assemblies and/or combinations.

What is claimed is:

1. A moveable target system comprising:
    target means for aiding in marksmanship practice including a frame, a target fixed to said frame, front and rear pairs of wheels journalled to said frame for supporting said target above the terrain surface for rolling movement thereacross, and power means for driving said front or rear pairs of wheels to rollingly propel said frame over said terrain surface;
    track means for establishing a prescribed course of movement for said target means, said track means including plural elongated flexible track members connected in an end to end manner to establish said course, each of said members defining substantially planar upper and lower surfaces and being flexibly displaceable along said prescribed course between (a) a terrain-engaging position wherein said lower surface of said track means is engaged with said terrain and (b) a displaced position wherein said lower surface is vertically spaced above the terrain surface; and
    connecting means fixed to and carried with said frame and defining a cavity vertically spaced above said terrain at a position substantially corresponding to said displaced position of said track means, said cavity for slidably receiving said track means, said conncting means for sequentially flexibly displacing said successive portions of said segments from said terrain-engaging position to said displaced position as said target means is propelled along said prescribed course and for permiting the sequential return of said successive portions from said displaced position to said terrain-engaging position, wherein said track means is flexibly displaced into said displaced position only in the vicinity of said connecting means; and wherein said track means includes plural anchor means axially separated from one another along said prescribed course for anchoring said track means to the terrain and yet permitting said portions of said track means to be upwardly flexibly displaced to said displaced position above said terrain surface.

2. A system as in claim 1 wherein said connecting means includes roller means for effecting rolling contact with said track means as said target means is propelled along said prescribed course.

3. A system as in claim 1 or 2 wherein each said anchor means includes (a) means defining an eyelet fixed to said lower surface of a selected one of said track members at an axially separated position along said prescribed course relative to adjacent ones of said eyelets, (b) an anchor associated with said eyelet defining means and adapted to being substantially embedded in the terrain, and (c) cable means connecting said eyelet defining means and said anchor for permitting flexible upward displacement of said track means to said displaced position in the vicinity of said eyelet defining means while yet securing the position of said track means relative to the terrain.

4. A system as in claim 3 wherein said connecting means defines a generally rectangular C-shaped cavity in cross section to permit said eyelet defining means to longitudinally pass therethrough as said target means is propelled along said prescribed course.

5. A system as in claim 4 wherein each said track member includes at one end a tongue portion and at the other end a yoke portion, said tongue and yoke portions of each said track member being mateable with yoke and tongue portions, respectively, of adjacent ones of said track members.

6. A system as in claim 5 wherein said track means further includes means coupling said tongue and yoke portions of adjacent track members to permit relative pivotal movement therebetween.

7. A system as in claim 6 wherein said coupling means includes a pivot pin.

8. A system as in claim 3 wherein each said anchor includes means defining an auger bit embeddable in the terrain.

9. A system as in claim 1 wherein each said track member includes at one end a tongue portion and at the other end a yoke portion, said tongue and yoke portions of each said track member being mateable with yoke and tongue portions, respectively, of adjacent ones of said track members.

10. A system as in claim 9 wherein said track means further includes means coupling said tongue and yoke portions of adjacent track members to permit relative pivotal movement therebetween.

11. A moveable target system comprising:
    target means for aiding in marksmanship practice including (a) a frame, (b) a target fixed to said frame, (c) front and rear pairs of wheels journalled to said frame for supporting said target above the terrain surfaces for rolling movement thereacross, (d) means to pivotally mount said front pair of wheels to said frame to permit each wheel of said front pair of wheels to be pivoted independently of the other wheel of said front pair of wheels about a respective substantially vertical steering axis, and (e) power means for driving said front or rear pairs of wheels to rollingly propel said frame over said terrain surface;
    track means for establishing a prescribed course of movement of said target means, said track means including plural flexible track members connected in an end-to-end manner to establish said course, at least one of said track members defining a horizontally curved section, successive portions of said track means being flexible along said prescribed course between a terrain-engaging position wherein said portion of said track means is engaged with said terrain surface and a displaced position wherein said portion of said track means is vertically spaced above said terrain surface; and conencting means rigidly fixed to and carried with said frame and defining a cavity vertically spaced above said terrain surface at a position substantially corresponding to said displaced position of said track means, said cavity slidably receiving said track for (i) sequentially flexibly displacing successive portions of said track means from said terrain-engaging position to said displaced position as said target means is propelled along said prescribed course and permitting the sequential return of said successive portions from said displaced position to said terrain-engaging position, wherein said track means is flexibly displaced into said displaced position only in the vicinity of said connecting means, and (ii) imparting a force to said frame means in a centrifugal direction when said connecting means encounters said horizontally curved section of said track means to responsively cause each said front pair of wheels to pivot about their respective steering axis in the direction of said curve whereby said frame means steerably follows said prescribed course.

* * * * *